(12) United States Patent
Broberg

(10) Patent No.: US 7,040,681 B1
(45) Date of Patent: May 9, 2006

(54) TOOL KIT FOR A RADIO-CONTROLLED VEHICLE

(75) Inventor: James E. Broberg, Crystal Lake, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 291 days.

(21) Appl. No.: 10/657,881

(22) Filed: Sep. 8, 2003

(51) Int. Cl.
*A45F 5/00* (2006.01)

(52) U.S. Cl. .................. 294/146; 294/159; 206/579

(58) Field of Classification Search ............... 294/137, 294/143, 145, 146, 148, 159; 206/579, 570, 206/573, 315.1, 373; 446/454, 455, 456; 211/85.7, 85.8, 70.6, 74
See application file for complete search history.

(56) References Cited

U.S. PATENT DOCUMENTS

| | | | | |
|---|---|---|---|---|
| 695,380 A | * | 3/1902 | Duer | 211/70.3 |
| 1,888,324 A | * | 11/1932 | Matthai | 211/74 |
| 2,590,154 A | * | 3/1952 | Burns | 280/47.19 |
| 3,058,504 A | * | 10/1962 | Powers | 211/70.2 |
| 3,608,795 A | * | 9/1971 | Klein et al. | 294/148 |

\* cited by examiner

*Primary Examiner*—Dean J. Kramer
(74) *Attorney, Agent, or Firm*—Mathew R.P. Perrone, Jr.

(57) ABSTRACT

A tool kit for a radio controlled vehicle holds any desired parts and equipment for that vehicle in a desired position, especially a position adjacent to a racing area. The tool kit contains elements for storing items such as a screw driver, plug wrench, glow plug igniter, electric vehicle starter, and an engine stopper. Spare parts, such as glow plugs, are also capable of being stored in the tool kit.

7 Claims, 3 Drawing Sheets

TOOL KIT FOR A RADIO-CONTROLLED VEHICLE

This invention relates to a tool kit for a radio-controlled vehicle, and more particularly to a tool kit for a radio-controlled vehicle capable of supporting required maintenance equipment for using a radio-controlled vehicle.

BACKGROUND OF THE INVENTION

Radio-controlled, miniature vehicles are well known as amusement and competition devices. Such vehicles have miniature internal combustion engines. The miniature internal combustion engine requires accessories, such as fuel and tools and spare parts for maintenance. Such tools include, but are not limited to a screw driver, plug wrench, glow plug igniter, electric vehicle starter and engine stopper. Needed spare parts include, but are not limited to glow plugs.

Although the fuel container, spare parts and tools are not large in size, storage can be a problem because of the small and delicate nature of the items. Because of the smaller size of this type of vehicle, an appropriate storage container that organizes and securely stores accessories, while keeping the accessories readily available to the user can be very useful.

Such a tool kit must hold the tools securely, yet have them readily accessible and yet permit easy transportation of both the kit and the equipment therein. Such requirements work against each other. It is very desirable to maximize all advantages, while minimizing the disadvantages.

SUMMARY OF THE INVENTION

Among the many objectives of this invention is the provision a tool kit for a radio-controlled vehicle adapted to hold accessories.

A further objective of this invention is the provision of a tool kit for a radio-controlled vehicle, which is easily transportable.

Yet a further objective of this invention is the provision of a tool kit for a radio-controlled vehicle, having tools, fuel bottle and spare parts that are readily accessible.

A still further objective of this invention is the provision of a tool kit for a radio-controlled vehicle which securely holds tools.

Another objective of this invention is the provision of a tool kit for a radio-controlled vehicle, which is durable.

Yet another objective of this invention is the provision of a tool kit for a radio-controlled vehicle which securely holds spare parts.

Still another objective of this invention is the provision of a tool kit for a radio-controlled vehicle which securely holds a fuel bottle.

These and other objectives of the invention (which other objectives become clear by consideration of the specification, claims and drawings as a whole) are met by providing a tool kit adapted to hold desired parts and equipment for a radio controlled vehicle, in a desired position, especially a position adjacent to a racing area.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

Within the tool kit for a radio-controlled vehicle of this invention. The toolkit has a base with two support posts thereon. Secured to the support posts and oppositely disposed from the base is the handle. The handle is elliptical shaped on the outside and has ridges to conform to fingers on the inside. Between the base and the support posts is the mounting bracket.

Within the base is a fuel cylinder receiver and at least one glow-plug receiver. A glow-plug is the device used to start the car. The glow-plug receiver may be snapped or threaded in order to receive and support the necessary replacement glow-plugs. The center clamp includes a back bar having a slot therein.

At each side of the back bar are the support apertures through which the support posts pass. Adjacent to the support apertures and oppositely disposed from the back bar are the tool apertures. The tool apertures may be a variety of sizes, depending upon the size of the tool they hold. Extending from the center clamp is the fuel clamp.

The fuel bottle comprises a squeeze bottle which can fit into the base receptacle and between the fuel and center clamps. A screwdriver may fit into the one tool aperture while the engine stopping device may fit into another other aperture. Into the slot, may fit a glow-plug starter holder or an electric starter clip. The glow-plug wrench may appear in a tool aperture between the support post and the slot.

Figure 1:
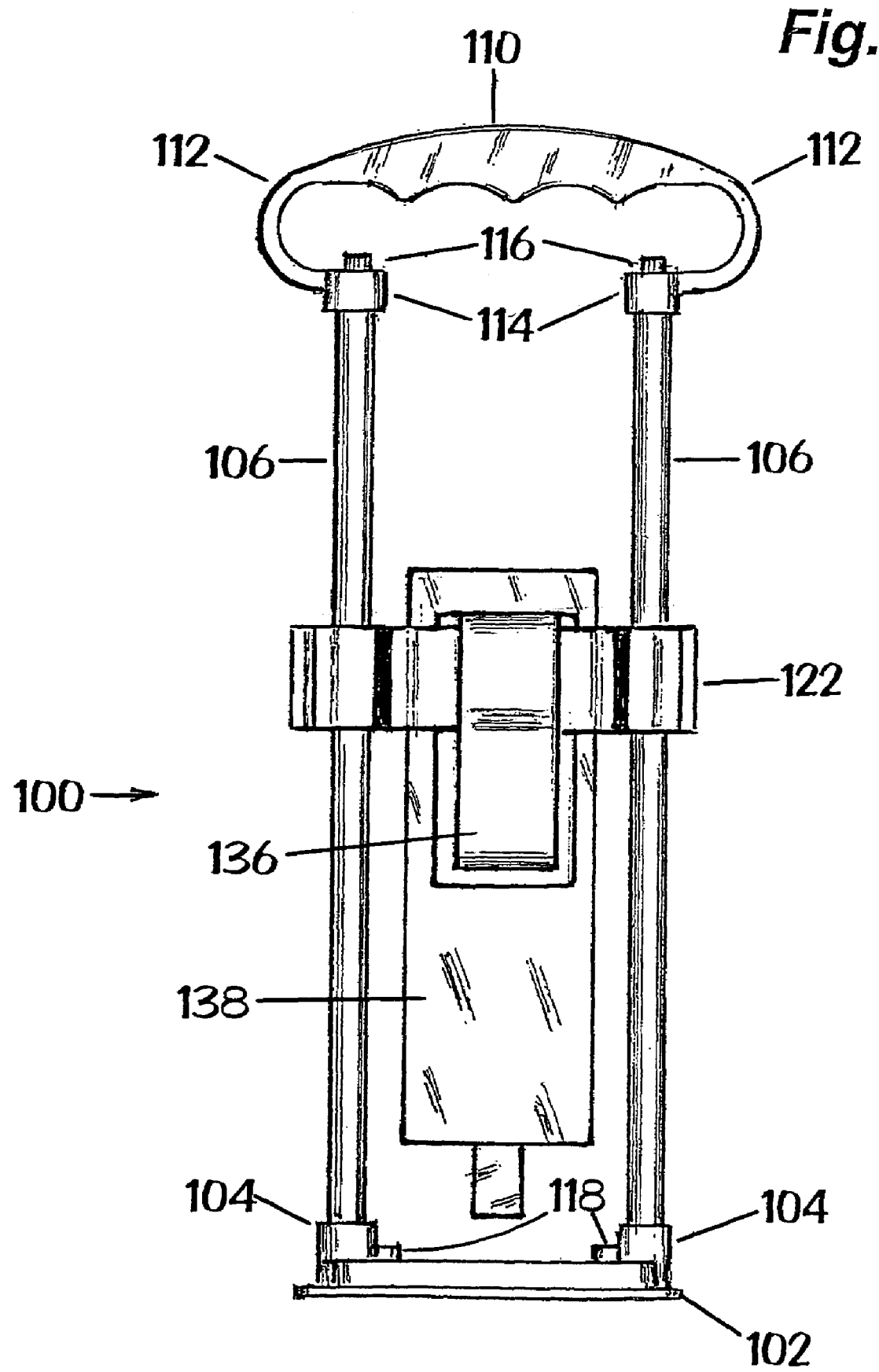
FIG. 1 depicts a perspective front view of the tool kit for a radio-controlled vehicle 100 of this invention.
Figure 2:
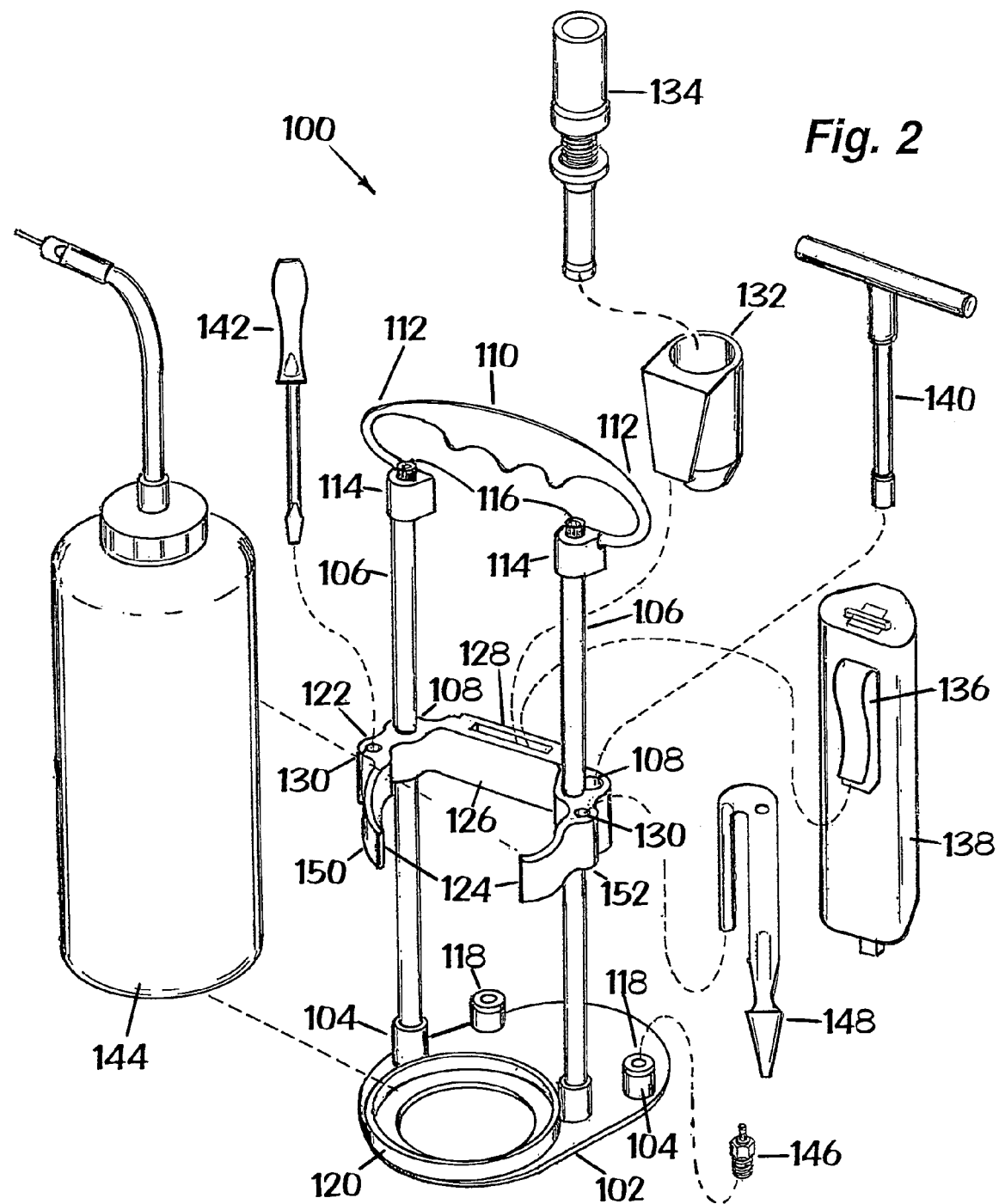
FIG. 2 depicts an exploded, perspective view of a first embodiment in the form of the tool kit for a radio-controlled vehicle 100 of this invention.
Figure 3:
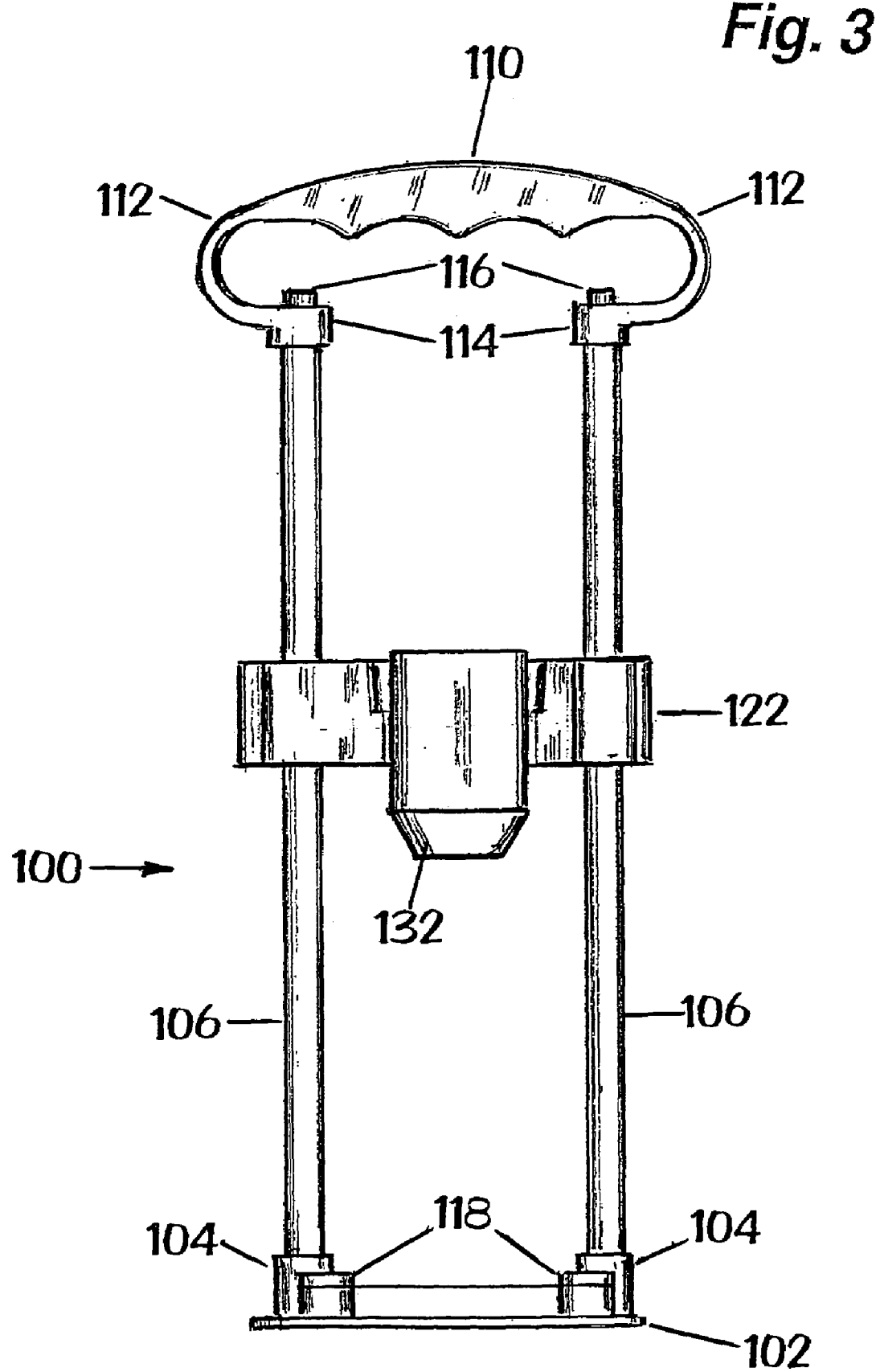
FIG. 3 depicts a perspective rear view of the tool kit for a radio-controlled vehicle 100 of this invention.

Referring now to FIG. 1, FIG. 2 and FIG. 3, the usefulness of the tool kit is evident. Tool kit 100 has four major parts: base 102, support posts 106, center clamp 122 and handle 110. Base 102 is a ridged sheet of durable material of any suitable shape. Preferred material for the base is plastic, but other suitable materials, such as wood or metal may be used. Mounted upon the top surface of base 102 is a fuel bottle receiver 120, which is a ring of plastic or other suitable material, sized slightly larger than fuel bottle 146. That fuel bottle receiver 120 has a diameter or other circumference, which is slightly larger than the base of fuel bottle 144.

Also mounted on the face of base 102 are two mounting brackets 104, which are two rings which receive the bottoms of support posts 106. Further mounted upon the base are one to eight glow plug receivers 118 which are rings properly sized to hold glow plug 146. The glow plug 146 may be attached to the glow plug receiver by screw or clip mechanism. In the preferred form, the top ends of support posts 106 are secured to the handle 110 using handle apertures 116, which are attached to handle feet 114. The two handle feet 114 are attached to the two ends of the handle spine 112. Other suitable configurations for connecting the support posts 106 to the handle 110 may be used.

Positioned on support posts 106 between base 102 and handle 110 is center clamp 122. Support posts 106 are connected to center clamp 122 by passing through center clamp support apertures 108. Center clamp 122 has a back bar 126 and fuel clamp 124.

Fuel clamp 124 has a left fuel clamp wing 150 and a right fuel clamp wing 152. Left fuel clamp wing 150 is a curved wing that protrudes out from the left center clamp support aperture 108 towards the center of tool rack 100. Right fuel clamp wing 152 is oppositely opposed from left fuel clamp 150, protruding out from right center clamp support aperture 108 towards the center of tool rack 100. Fuel clamp 124 is situated above and mimics the shape of fuel bottle receiver 120, and holds the top of the fuel bottle 144.

Located on fuel clamp 124 are one to eight tool apertures 130, which are sized to accept various tools. Such tools include but are not limited to plug wrench 140, engine stopper 148 and screw driver 142.

Located in the center of back bar 126 is back bar slot 128, which is shaped to receive glow plug igniter holder 132 and electric starter clip 136. Glow plug igniter 134 fits inside glow plug igniter holder 132 in order to facilitate its attachment to the tool rack 100. Electric starter clip 136 is a U-shaped flexible strip attached to the side of electric vehicle starter 138 to facilitate its attachment to the tool rack 100. The preferred material for electric starter clip 136 is metal, but plastic or other suitable materials may be used.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A kit for a radio controlled vehicle adapted to hold accessories, comprising:
    (a) a base being connected to support posts, a handle and a support clamp;
    (b) the support posts being fastened to the base;
    (c) the handle being mounted to the support posts and oppositely disposed from the base;
    (d) the support clamp being attached to the support posts, and being situated between the base and the handle;
    (e) the base having a holding mechanism for a fuel bottle;
    (g) the support clamp having a holding mechanism for a fuel bottle;
    (h) the base having up to eight holding mechanisms for a glow plug; and
    (i) the holding mechanism for the glow plug having a screw holding mechanism.

2. A kit for a radio controlled vehicle adapted to hold accessories, comprising:
    (a) a base being connected to support posts, a handle and a support clamp;
    (b) the support posts being fastened to the base;
    (c) the handle being mounted to the support posts and oppositely disposed from the base;
    (d) the support clamp being attached to the support posts, and being situated between the base and the handle;
    (e) the base having a holding mechanism for a fuel bottle;
    (f) the support clamp having a holding mechanism for a fuel bottle;
    (g) the base having up to eight holding mechanisms for a glow plug;
    (h) the support clamp having one to eight apertures for the receiving of tools;
    (i) the support clamp having a slot for receiving a standardly available holder for a glow plug igniter;
    (j) the support clamp having a slot for receiving the clip on a standardly available electric vehicle starter;
    (k) a spine including a grasping portion with an elliptical shaped outer part and ridges on the inner surface that conform to the shape of fingers;
    (l) two feet on either side of the spine; and
    (M) one aperture in each foot for the receiving and securing of the support posts.

3. The kit of claim 2 further comprising the support clamp's holding mechanism for the fuel bottle having:
    (a) a curved left wing which protrudes from a left from center clamp support aperture;
    (b) a curved right wing which protrudes from a right of center clamp support aperture;
    (c) the left and right wing being oppositely opposed from each other;
    (d) the shape of the wings mimicking the shape of the fuel bottle.

4. The kit of claim 3 further comprising the base fuel bottle holding mechanism having a ring attached to the top face of the base that is sized slightly larger than the fuel bottle that receives the fuel bottle within.

5. A kit for a radio controlled vehicle adapted to hold accessories, comprising:
    (a) a base being connected to support posts, a handle and a support clamp;
    (b) the support posts being fastened to the base;
    (c) the handle being mounted to the support posts and oppositely disposed from the base;
    (d) the support clamp being attached to the support posts, and being situated between the base and the handle;
    (e) the base having a holding mechanism for a fuel bottle;
    (f) the support clamp having a holding mechanism for a fuel bottle;
    (g) the base having at least one holding mechanism for a glow plug;
    (h) the at least one holding mechanism for a glow plug being a screw holding mechanism;
    (i) the base having up to eight holding mechanisms for a glow plug;
    (j) the support clamp having at least one to eight apertures for the receiving of tools;
    (k) the support clamp having a slot for receiving a standardly available holder for a glow plug igniter;
    (l) the clamp having a slot for receiving the clip on a standardly available electric vehicle starter;
    (m) a spine having a grasping portion with an elliptical shaped outer part and ridges on the inner surface that conform to the shape of fingers;
    (n) two feet on either side of the spine; and
    (o) one aperture in each foot for the receiving and securing of the support posts.

6. The kit of claim 5 further comprising the support clamp's holding mechanism for the fuel bottle having:
    (a) a curved left wing which protrudes from a left from center clamp support aperture;
    (b) a curved right wing which protrudes from a right of center clamp support aperture;
    (c) the left and right wing being oppositely opposed from each other; and
    (d) the shape of the wings mimicking the shape of the fuel bottle.

7. The kit of claim 6 further comprising the base fuel bottle holding mechanism having of a ring attached to the top face of the base that is sized slightly larger than the fuel bottle that receives the fuel bottle within.

* * * * *